United States Patent
Naniwa et al.

(10) Patent No.: US 10,840,956 B2
(45) Date of Patent: Nov. 17, 2020

(54) SWITCH IC, HIGH-FREQUENCY MODULE, AND COMMUNICATION APPARATUS

(71) Applicant: Murata Manufacturing Co., Ltd., Nagaokakyo (JP)

(72) Inventors: Yusuke Naniwa, Nagaokakyo (JP); Hideki Muto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/377,326

(22) Filed: Apr. 8, 2019

(65) Prior Publication Data

US 2019/0238169 A1    Aug. 1, 2019

Related U.S. Application Data

(63) Continuation of application No. PCT/JP2017/040183, filed on Nov. 8, 2017.

(30) Foreign Application Priority Data

Nov. 11, 2016  (JP) .................................. 2016-221000

(51) Int. Cl.
*H04B 1/10* (2006.01)
*H04B 1/38* (2015.01)
*H04B 1/00* (2006.01)
*H04B 1/48* (2006.01)

(52) U.S. Cl.
CPC ............ *H04B 1/1027* (2013.01); *H04B 1/00* (2013.01); *H04B 1/006* (2013.01); *H04B 1/10* (2013.01); *H04B 1/1018* (2013.01); *H04B 1/38* (2013.01); *H04B 1/48* (2013.01)

(58) Field of Classification Search
CPC ...... H04B 1/38; H04B 1/1027; H04B 1/1018; H01L 27/00; H01L 27/02
USPC ........................................................ 455/296
See application file for complete search history.

(56) References Cited

U.S. PATENT DOCUMENTS

| | | | |
|---|---|---|---|
| 2005/0151599 | A1 | 7/2005 | Ido et al. |
| 2011/0260806 | A1 | 10/2011 | Takeuchi |
| 2014/0002209 | A1 | 1/2014 | Ono |
| 2014/0367846 | A1 | 12/2014 | Nakagawa et al. |

(Continued)

FOREIGN PATENT DOCUMENTS

| | | |
|---|---|---|
| CN | 1638117 A | 7/2005 |
| CN | 104241264 A | 12/2014 |
| JP | 2003-037173 A | 2/2003 |

(Continued)

OTHER PUBLICATIONS

Official Communication issued in International Patent Application No. PCT/JP2017/040183, dated Jan. 30, 2018.

*Primary Examiner* — Lee Nguyen
(74) *Attorney, Agent, or Firm* — Keating & Bennett, LLP

(57) ABSTRACT

An RF module includes a switch IC on a surface of a module substrate and a passive circuit provided in and/or on the module substrate. The switch IC includes a high-frequency circuit on an IC substrate and a digital control circuit. In a plan view of the IC substrate, the digital control circuit is surrounded by the high-frequency circuit. The high-frequency circuit includes analog ground electrodes in a boundary portion with the digital control circuit in the high-frequency circuit to surround the digital control circuit in the plan view.

19 Claims, 5 Drawing Sheets

(56) References Cited

U.S. PATENT DOCUMENTS

2017/0110451 A1* 4/2017 Fraser .................. H01L 27/085

FOREIGN PATENT DOCUMENTS

| JP | 2007-266840 A | 10/2007 |
|----|---------------|---------|
| WO | 2010/053131 A1 | 5/2010 |
| WO | 2012/128271 A1 | 9/2012 |

* cited by examiner

SWITCH IC, HIGH-FREQUENCY MODULE, AND COMMUNICATION APPARATUS

CROSS REFERENCE TO RELATED APPLICATIONS

This application claims the benefit of priority to Japanese Patent Application No. 2016-221000 filed on Nov. 11, 2016 and is a Continuation Application of PCT Application No. PCT/JP2017/040183 filed on Nov. 8, 2017. The entire contents of each of these applications are hereby incorporated herein by reference.

BACKGROUND OF THE INVENTION

1. Field of the Invention

The present invention relates to a switch integrated circuit (IC), a high-frequency module, and a communication apparatus.

2. Description of the Related Art

Digital control circuits have become the mainstream of circuits that control conduction and non-conduction of switches composing high-frequency front-end circuits, gain adjustment of amplifier circuits, and so on in recent years. The digital control circuits are capable of controlling transmission and reception in the high-frequency front-end circuits with high accuracy by controlling the conduction and the non-conduction of the switches, the gain adjustment of amplifier circuits, and so on in response to digital control signals.

Japanese Unexamined Patent Application Publication No. 2003-37173 discloses a mixed integrated circuit in which analog circuits that process signals of desired frequency bands and digital circuits are mixed on the same semiconductor chip. The digital circuits, such as an analog-to-digital (A/D) converter and a digital-to-analog (D/A) converter, are arranged in a substantially central portion of the semiconductor chip. With this configuration, it may be possible to reduce coupling noise occurring on lines and loss on the lines even if the lengths of the lines from a pad provided in a peripheral portion of the semiconductor chip to the digital circuits are increased.

It is important to improve the signal quality of multiple high-frequency bands processed in the high-frequency front-end circuits in mobile communication devices, such as mobile phones, especially in conjunction with increasing multiband support.

However, in the mixed integrated circuit described in Japanese Unexamined Patent Application Publication No. 2003-37173, the A/D converter and the D/A converter arranged in a central portion of the semiconductor chip are sandwiched between radio-frequency (RF) circuits and interface (IF) circuits, and a baseband signal processing circuit and an audio signal processing circuit. When the high-frequency circuits that process high-frequency signals of different frequency bands are arranged in the RF circuits in this configuration, the area in which the RF circuits are arranged is limited to an area in which the baseband signal processing circuit and the audio signal processing circuit are not arranged and is limited to a specific direction from the digital circuits. In addition, the baseband signal processing circuit that is less subjected to interference of digital signals is arranged so as to be adjacent to the A/D converter and the D/A converter. Accordingly, it is difficult to arrange multiple high-frequency lines in the RF circuits and digital lines in the digital circuits so as not be adjacent to each other. Consequently, isolation between the digital circuits and the RF circuits is not ensured and the interference of the digital signals on the multiple RF lines is not effectively reduced or prevented. As a result, a signal to noise (S/N) ratio of the high-frequency signals and receiving sensitivity are degraded.

SUMMARY OF THE INVENTION

Preferred embodiments of the present invention provide switch ICs, high-frequency modules, and communication apparatuses in each of which interference of digital control signals on high-frequency signals is reduced or prevented.

A switch IC according to a preferred embodiment of the present invention includes an IC substrate; a high-frequency circuit that is provided on the IC substrate and that includes an amplifier amplifying a high-frequency signal and a switch switching a propagation path of the high-frequency signal; and a digital control circuit that is provided on the IC substrate. In a plan view of the IC substrate, the digital control circuit is surrounded by the high-frequency circuit.

With the above configuration, since the respective circuit elements defining the high-frequency circuit are disposed around the digital control circuit, it is possible to reduce or prevent intersection and parallel extension of digital lines on which digital control signals are transmitted and lines with which high-frequency circuit elements are connected to each other. The digital control circuit is capable of being disposed so as to be physically spaced apart from any high-frequency circuit elements. In addition, a variation in length between the respective digital lines connected to the respective high-frequency circuit elements is reduced or prevented to exclude extremely long digital lines. Accordingly, isolation between the digital control circuit and the high-frequency circuit is improved to reduce or prevent interference of digital noise (spurious signal) to the high-frequency circuit. As a result, it is possible to reduce or prevent degradation of the S/N ratio of the high-frequency signals and degradation of receiving sensitivity.

A high-frequency module according to a preferred embodiment of the present invention includes a module substrate including a first main surface and a second main surface that are opposed to each other; the switch IC provided on the first main surface; and a passive circuit that is provided in and on the module substrate and that is connected to at least one of the amplifier and the switch. The high-frequency circuit includes multiple analog ground electrodes. The multiple analog ground electrodes are disposed in a boundary portion with the digital control circuit in the high-frequency circuit so as to surround the digital control circuit in the plan view.

With the above configuration, since the high-frequency circuit is disposed between the digital control circuit and the passive circuit, it is possible to arrange the digital control circuit so as to be spaced apart from any circuit element of the passive circuit. Accordingly, the isolation between the digital control circuit and the passive circuit and the isolation between the digital control circuit and analog lines are improved to reduce or prevent the interference of the digital noise (spurious signal) to the passive circuit and the analog lines. As a result, it is possible to reduce or prevent the degradation of the S/N ratio of the high-frequency signals and the degradation of the receiving sensitivity. In addition, surrounding the digital control circuit with the analog ground electrodes enables the digital control circuit to be efficiently isolated from the high-frequency circuit and the passive circuit to efficiently reduce or prevent the interference of the digital control signals to the high-frequency signals.

Furthermore, since the digital control circuit is surrounded by the high-frequency circuit, the isolation between the digital control circuit and external circuits of the high-frequency module and the isolation between the digital control circuit and the analog lines in the external circuits are improved. This reduces or prevents the interference of the digital noise (spurious signal) to the external circuits and the analog lines. As a result, it is possible to reduce or prevent the degradation of the S/N ratio of the high-frequency signals and the degradation of the receiving sensitivity.

The switch IC may be surrounded by the passive circuit in a plan view of the module substrate.

With the above configuration, since the respective circuit elements of the passive circuit are radially disposed around the digital control circuit and the high-frequency circuit, it is possible to reduce or prevent the intersection and the parallel extension of the digital lines on which the digital control signals are transmitted and lines with which the passive circuit elements are connected to the high-frequency circuit elements. In addition, a variation in length between the respective high-frequency lines with which the passive circuit elements are connected to the high-frequency circuit elements is reduced or prevented to exclude the extremely long high-frequency lines. Accordingly, it is possible to improve the isolation between the high-frequency signals, for example, in concurrent transmission and reception of the high-frequency signals of different frequency bands. Furthermore, it is possible to reduce or prevent the radiation of the digital noise to the external circuits of the high-frequency module.

The digital control circuit may include a digital ground electrode. The module substrate may include a first ground via line that is connected to the multiple analog ground electrodes and that extends from the first main surface to the second main surface and a second ground via line that is connected to the digital ground electrode and that extends from the first main surface to the second main surface. The first ground via line and the second ground via line may be isolated from each other in the module substrate.

With the above configuration, the isolation between the first ground via line (analog ground line) and the second ground via line (digital ground line) is improved to reduce or prevent the interference of the digital noise (spurious signal) to the high-frequency signals via the ground lines in the module substrate. As a result, it is possible to reduce or prevent the degradation of the S/N ratio of the high-frequency signals and the degradation of the receiving sensitivity.

The module substrate may include a digital line through which a digital control signal to switch between conduction and non-conduction of the switch is transmitted and which extends from the first main surface to the second main surface, an analog line through which the high-frequency signal is transmitted and which extends from the first main surface to the second main surface, at least one first terminal that is connected to the digital line and disposed on the second main surface, and at least one second terminal that is connected to the analog line and disposed on the second main surface. All of the second terminals may be disposed in an outer peripheral portion of all of the first terminals in a plan view of the second main surface.

With the above configuration, since the digital control circuit is disposed in a central portion of the first main surface and the first terminal is disposed in a central portion of the second main surface (a position opposed to the digital control circuit with the module substrate sandwiched therebetween), the digital lines are capable of being wired in the module substrate in a shortest configuration. In addition, since the analog (high-frequency) lines are disposed in an outer peripheral portion of the digital lines, the isolation between the analog lines and the digital lines is improved to reduce or prevent the interference of the signals on the digital lines on the signals on the analog (high-frequency) lines. As a result, it is possible to reduce or prevent the degradation of the S/N ratio of the high-frequency signals and the degradation of the receiving sensitivity. Furthermore, it is possible to easily isolate the analog lines and the digital lines from each other also in a mounting substrate on which the high-frequency module is mounted.

The module substrate may further include a power supply line through which power supply voltage is supplied to the digital control circuit and the high-frequency circuit and which extends from the first main surface to the second main surface and a third terminal that is connected to the power supply line and that is disposed on the second main surface. The third terminal may be disposed in an outer peripheral portion of all of the first terminals in the plan view of the second main surface.

With the above configuration, the power supply line is disposed in an outer peripheral portion of the digital lines and the isolation between the power supply line and the digital lines is capable of being ensured while supplying the power supply voltage to the digital control circuit and the high-frequency circuit through the power supply line. In addition, for example, a decoupling capacitor necessary for the power supply line is capable of being easily disposed in the high-frequency module or in a portion closest to the module substrate.

The high-frequency module may further include a first input-output terminal and a second input-output terminal. The high-frequency circuit may include, as the switch, a first switch that switches connection of the first input-output terminal to either of a first signal path on which a high-frequency signal in a first frequency band is propagated and a second signal path on which a high-frequency signal in a second frequency band at the high frequency side of the first frequency band is propagated and a second switch that switches connection of the amplifier to either of the first signal path and the second signal path. The amplifier may be connected between the second switch and the second input-output terminal. The passive circuit may include a first filter which is disposed on the first signal path between the first switch and the second switch and a pass band of which is the first frequency band, a second filter which is disposed on the second signal path between the first switch and the second switch and a pass band of which is the second frequency band, and an impedance matching element that is disposed on the first signal path or the second signal path and that is incorporated in the module substrate.

With the above configuration, the high-frequency module is applied as a multiband front-end module that processes high-frequency signals in two or more high-frequency bands. Here, the circuit elements defining the first switch, the second switch, and the amplifier circuit are radially disposed around the digital control circuit. In addition, since the first switch, the second switch, and the amplifier circuit are disposed between the digital control circuit and the first filter, the second filter, and the impedance matching element, the digital control circuit is capable of being spaced apart from any circuit element of the passive circuit. Accordingly, the isolation between the digital control circuit and the passive circuit and the high-frequency circuit is improved to reduce or prevent the interference of the digital noise (spurious signal) to the respective switches, the amplifier circuit, the respective filters, and the impedance matching element. As a result, it is possible to reduce or prevent the degradation of the S/N ratio of the high-frequency signals and the degradation of the receiving sensitivity and, furthermore, to improve the isolation between the first signal path and the second signal path.

A communication apparatus according to a preferred embodiment of the present invention includes an RF signal processing circuit that processes a high-frequency signal transmitted and received with an antenna element and the high-frequency module, and which transmits the high-frequency signal between the antenna element and the RF signal processing circuit.

With the above configuration, the isolation between the digital control circuit and the high-frequency circuit and the passive circuit is improved to reduce or prevent the interference of the digital noise (spurious signal) to the high-frequency circuit and the passive circuit. As a result, it is possible to provide the communication apparatus in which the degradation of the S/N ratio of the high-frequency signals and the degradation of the receiving sensitivity are reduced or prevented.

With the switch ICs, the high-frequency modules, and the communication apparatuses according to preferred embodiments of the present invention, the isolation between the digital control circuit and the high-frequency circuit is improved to reduce or prevent the interference of the digital noise (spurious signal) to the high-frequency circuit. As a result, it is possible to reduce or prevent the degradation of the S/N ratio of the high-frequency signals and the degradation of the receiving sensitivity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
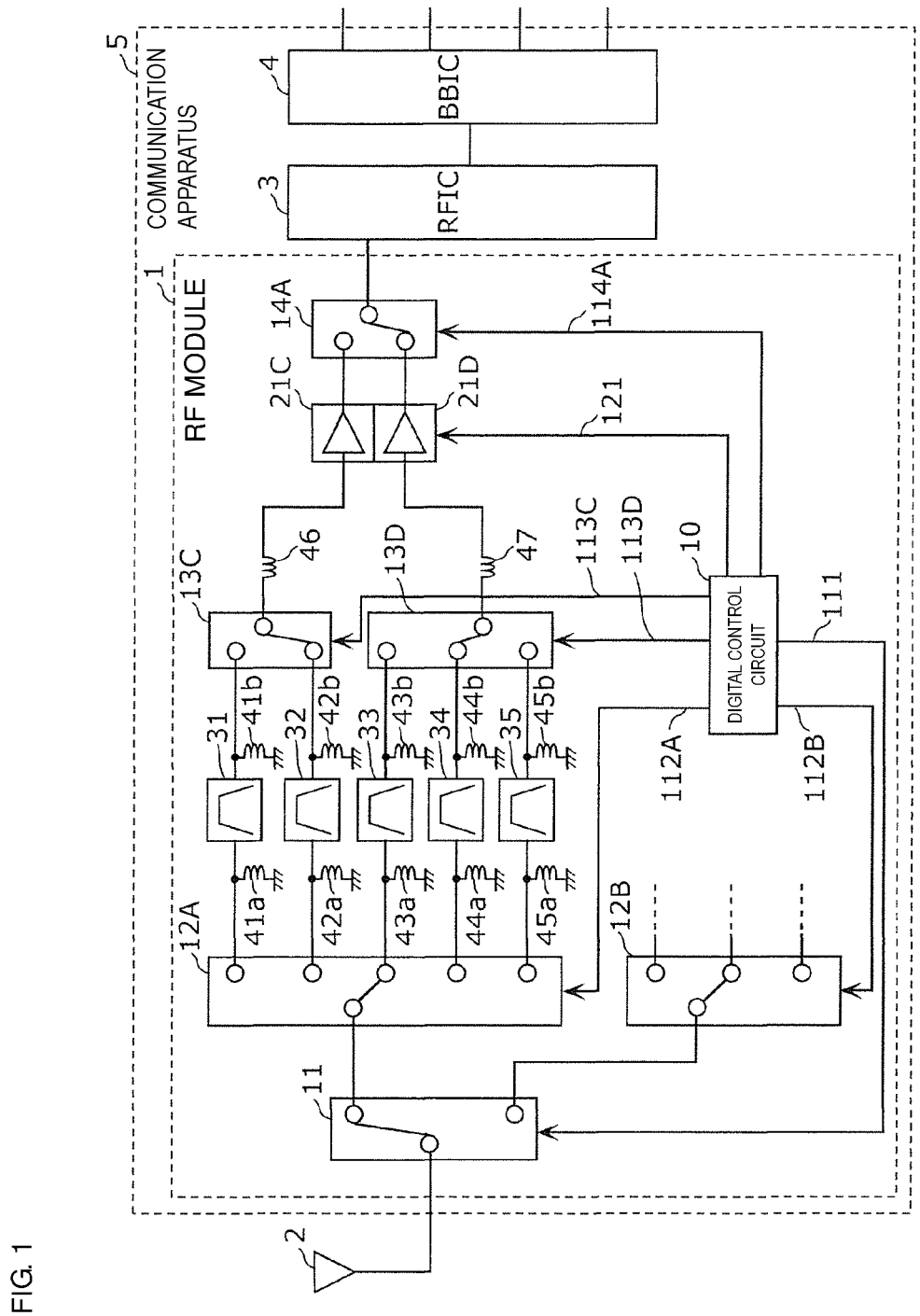
FIG. 1 is a configuration diagram of functional blocks of a communication apparatus according to a preferred embodiment of the present invention.

Preferred embodiments of the present invention will be described in detail below using the preferred embodiments as examples and with reference to the drawings. All of the preferred embodiments described below indicate comprehensive or specific examples. Numerical values, shapes, materials, components, the arrangement of the components, the connection structure of the components, and other features and elements, which are indicated in the preferred embodiments described below, are only examples and are not intended to limit the scope of the present invention. Among the components in the preferred embodiments described below, the components that are not described in the independent claims are described as optional components. In addition, the sizes or the ratios of the sizes of the components illustrated in the drawings are not necessarily strictly indicated.

Preferred Embodiment 1

FIG. 1 is a configuration diagram of functional blocks of a communication apparatus 5 according to a preferred embodiment of the present invention. The communication apparatus 5 and an antenna element 2 are illustrated in FIG. 1. The communication apparatus 5 includes a radio-frequency (RF) module 1, an RF signal processing circuit (radio-frequency integrated circuit (RFIC)) 3, and a baseband signal processing circuit (baseband integrated circuit (BBIC)) 4. The RF module 1 is preferably provided in, for example, a front-end unit in a multimode-multiband mobile phone.

The RF module 1 is a high-frequency module including a digital control circuit 10, switches 11, 12A, 12B, 13C, 13D, and 14A, low-noise amplifiers 21C and 21D, filters 31, 32, 33, 34, and 35, and inductors 41a, 41b, 42a, 42b, 43a, 43b, 44a, 44b, 45a, 45b, 46, and 47.

The digital control circuit 10, the switches 11, 12A, 12B, 13C, 13D, and 14A, and the low-noise amplifiers 21C and 21D define a switch integrated circuit (IC) and are provided in or on an IC substrate (not illustrated). The switches 11, 12A, 12B, 13C, 13D, and 14A and the low-noise amplifiers 21C and 21D define a high-frequency circuit.

Each of the switches 11, 12A, 12B, 13C, 13D, and 14A switches a propagation path of a high-frequency signal input into the RF module 1.

Each of the low-noise amplifiers 21C and 21D defines and functions as an amplifier that amplifies the high-frequency reception signal input into the RF module 1.

The filters 31 to 35 and the inductors 41a to 47 define a passive circuit connected to the switches 11 to 14A or the low-noise amplifiers 21C and 21D. The inductors 41a to 47 define and function as impedance matching elements.

A common terminal of the switch 11 corresponds to a first input-output terminal of the RF module 1 and a common terminal of the switch 14A corresponds to a second input-output terminal of the RF module 1.

More specifically, each of the switches 11 to 14A includes a common terminal and multiple selection terminals and switches connection of the common terminal to any of the multiple selection terminals. An arbitrary number of selection terminals may be provided. The switch 11 switches, for example, connection of the antenna element 2 to either of a signal path of a first frequency band group and a signal path of a second frequency band group at the high frequency side of the first frequency band group. The signal path in the first frequency band group is connected to the switch 12A, and the signal path in the second frequency band group is connected to the switch 12B.

The switch 12A switches connection of the switch 11 to any of the filters 31 to 35. The switch 12A is a first switch that switches connection of the common terminal of the switch 11 to either of a first signal path on which a high-frequency signal in a first frequency band is propagated (for example, a path on which the filter 31 is disposed) and a second signal path on which a high-frequency signal in a second frequency band at the high frequency side of the first frequency band is propagated (for example, a path on which the filter 33 is disposed). The switch 13C switches connection of the low-noise amplifier 21C to either of the filters 31 to 32. The switch 13C is a second switch that switches connection of the low-noise amplifier 21C to either of two different signal paths. The switch 13D switches connection of the low-noise amplifier 21D to any of the filters 33 to 35. The switch 13D is the second switch that switches connection of the low-noise amplifier 21D to any of three different signal paths. The switch 12B switches connection between the switch 11 and a filter a pass band of which is the second frequency band group. The switch 14A switches connection of the RF signal processing circuit (RFIC) 3 to either of the low-noise amplifiers 21C to 21D.

The filters 31 to 35 are reception filters that have different pass bands, that perform filtering of signals, which are received with the antenna element 2 and which are supplied through the switches 11 and 12A, in the respective pass bands, and that supply the reception signals to the low-noise amplifier 21C or 21D. For example, the filter 31 is a first filter which is between the switches 12A and 13C and the pass band of which is the first frequency band. The filter 33 is the first filter which is between the switches 12A and 13D and the pass band of which is the second frequency band.

The RF signal processing circuit (RFIC) 3 performs signal processing, such as down-conversion, of the high-frequency reception signal supplied from the antenna element 2 through the RF module 1 and supplies the reception signal subjected to the signal processing to the baseband signal processing circuit (BBIC) 4.

The baseband signal processing circuit (BBIC) 4 is a circuit that performs signal processing using an intermediate frequency band at the low frequency side of the frequency band of the high-frequency signals in the front-end unit. The signal processed in the baseband signal processing circuit (BBIC) 4 is used as, for example, an image signal for display of an image or an audio signal for calling with a speaker.

The digital control circuit 10 is provided on the IC substrate on which the high-frequency circuit is provided and supplies a digital control signal to switch between conduction and non-conduction of the switches 11, 12A, 12B, 13C, 13D, and 14A to the switches 11, 12A, 12B, 13C, 13D, and 14A through digital control lines 111, 112A, 112B, 113C, 113D, and 114A, respectively. In addition, the digital control circuit 10 supplies a digital control signal to adjust the amplification factor of the low-noise amplifiers 21C and 21D to the low-noise amplifiers 21C and 21D through digital control lines 121C and 121D, respectively. The digital control circuit 10 supplies the digital control signals to the switches 11 to 14A and the low-noise amplifiers 21C and 21D in response to a pulsed serial clock signal.

With the above configuration, the RF module 1 propagates the high-frequency signal received with the antenna element 2 through an appropriate signal path by controlling the switches 11 to 14A with the digital control circuit 10 to transmit the high-frequency signal to the RF signal processing circuit (RFIC) 3 and the baseband signal processing circuit (BBIC) 4.

Although the RF module 1, which is a reception demultiplexing circuit, is exemplified as the high-frequency module in the present preferred embodiment, the high-frequency module of the present invention may be a transmission multiplexing circuit or may be a demultiplexing-multiplexing circuit capable of both transmission and reception. In addition, the RF module 1 is not limited by the number of frequency bands (signal paths). Furthermore, the RF module 1 is applicable to a system that not only selects one signal path but also is capable of concurrently receiving the high-frequency signals in multiple frequency bands. In this case, a configuration is provided in which the switch 11 is not provided and the common terminals of the switches 12A and 12B are connected to the antenna element 2.

Figure 2:
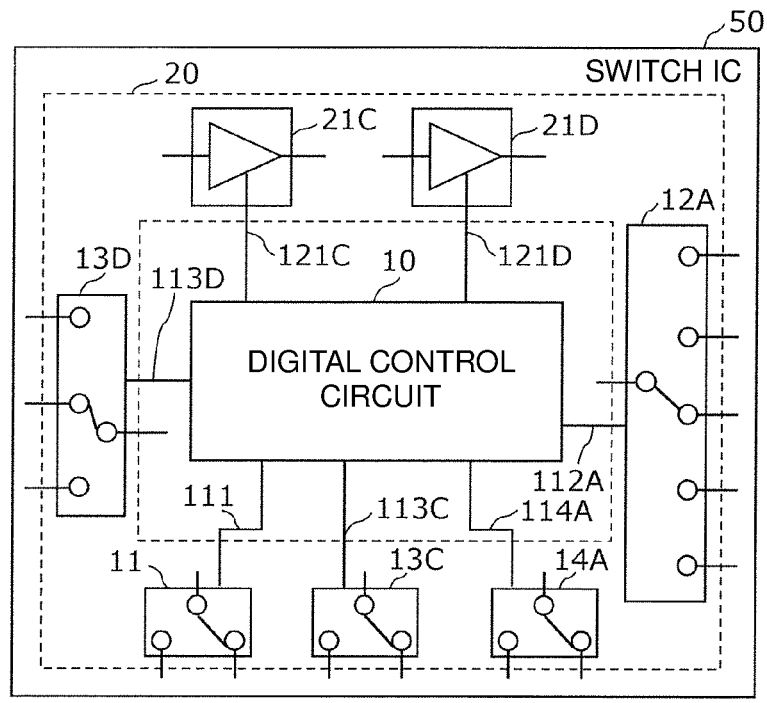
FIG. 2 is a schematic plan view of the circuit layout of a switch IC according to a preferred embodiment of the present invention.

FIG. 2 is a schematic plan view of the circuit layout of a switch IC 50 according to a preferred embodiment of the present invention. The switch IC 50 illustrated in FIG. 2 includes the digital control circuit 10 and a high-frequency circuit 20. The digital control circuit 10 and the high-frequency circuit 20 are provided on the same IC substrate.

The high-frequency circuit 20 includes the switches 11, 12A, 12B, 13C, 13D, and 14A and the low-noise amplifiers 21C and 21D illustrated in FIG. 1.

The respective circuit elements of the high-frequency circuit 20 and the digital control circuit 10 are connected with the digital control lines 111, 112A, 112B, 113C, 113D, and 114A.

Here, in the switch IC 50, the digital control circuit 10 is surrounded by the high-frequency circuit 20 in a plan view of the IC substrate. In other words, the high-frequency circuit is disposed in an outer peripheral portion of the digital control circuit 10. When the digital control circuit 10 has a rectangular or substantially rectangular shape, at least one circuit element of the high-frequency circuit 20 is disposed at a position opposed to any side of the rectangular shape.

Figure 3:
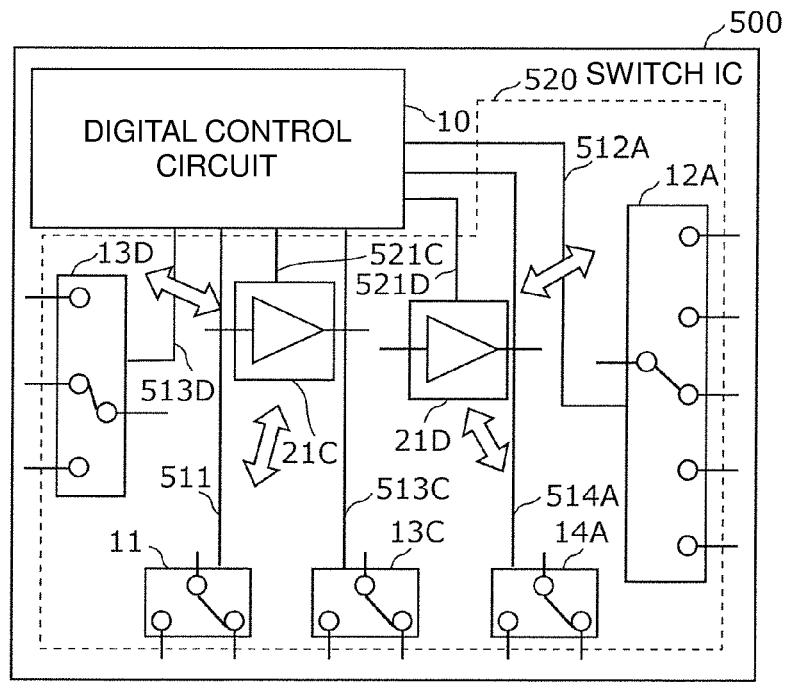
FIG. 3 is a schematic plan view of the circuit layout of a switch IC according to a comparative example.

FIG. 3 is a schematic plan view of the circuit layout of a switch IC 500 according to a comparative example. The switch IC 500 illustrated in FIG. 3 includes the digital control circuit 10 and a high-frequency circuit 520. The digital control circuit 10 and the high-frequency circuit 520 are provided on the same IC substrate. The high-frequency circuit 520 includes the switches 11, 12A, 12B, 13C, 13D, and 14A and the low-noise amplifiers 21C and 21D. The respective circuit elements of the high-frequency circuit 520 and the digital control circuit 10 are connected with digital control lines 511, 512A, 512B, 513C, 513D, and 514A.

Here, in the switch IC 500 according to the comparative example, in a plan view of the IC substrate, the digital control circuit 10 is not surrounded by the high-frequency circuit 520 and is disposed in an end portion (an upper left end portion in FIG. 3) of the IC substrate. In other words, in the high-frequency circuit 520, when the digital control circuit 10 has a rectangular or substantially rectangular shape, the circuit elements of the high-frequency circuit 520 are not disposed at positions opposed to the respective sides of the rectangular or substantially rectangular shape. Specifically, the circuit elements of the high-frequency circuit 520 are disposed at positions opposed to two sides of the rectangular or substantially rectangular shape but are not disposed at positions opposed to the remaining two sides thereof in FIG. 3.

With the configuration of the switch IC 500 according to the comparative example, the difference in length between the respective digital lines connected to the respective circuit elements of the high-frequency circuit 520 is large and extremely long digital lines (the digital control lines 511, 513C, and 514A in FIG. 3) are provided. In this case, the long digital control lines 511, 513C, and 514A intersect with or extend in parallel or substantially in parallel with high-frequency lines with which the respective circuit elements of the high-frequency circuit 520 are connected. Accordingly, digital noise (a spurious signal) is superimposed on the high-frequency circuit 520 via the digital lines. In addition, when the digital control circuit 10 is disposed in an outer peripheral portion of the switch IC 500, the digital noise also radiates to the outside of the switch IC 500. Furthermore, since the frequency at which the respective circuit elements of the high-frequency circuit 520 are disposed so as to be adjacent to each other is increased, for example, high-frequency noise radiated from amplifier circuits, such as the low-noise amplifiers 21C and 21D, is easily superimposed on other circuit elements, such as the switches.

In contrast, with the switch IC 50 according to the present preferred embodiment, the respective circuit elements of the high-frequency circuit 20 are radially disposed around the digital control circuit 10 on the IC substrate.

With the above layout configuration, it is possible to reduce or prevent the intersection and the parallel extension of the respective digital lines on which the digital control signals are transmitted and the lines with which the circuit elements of the high-frequency circuit 20 are connected to each other. In addition, the digital control circuit 10 is capable of being physically spaced apart from any circuit element in the high-frequency circuit 20. Furthermore, a variation in length between the respective digital lines connected to the respective circuit elements is reduced or prevented to exclude the extremely long digital lines. Accordingly, isolation between the digital control circuit 10 and the high-frequency circuit 20 is improved, the superimposition of the digital noise (spurious signal) on the high-frequency circuit 20 via the digital lines is reduced or prevented, and interference of the digital signals to the high-frequency signals is reduced or prevented. As a result, it is possible to reduce or prevent degradation of the S/N ratio of the high-frequency signals propagated in the high-frequency circuit 20 and degradation of the receiving sensitivity. In addition, it is possible to reduce or prevent radiation of the digital noise to circuits outside the switch IC 50.

Figure 4:
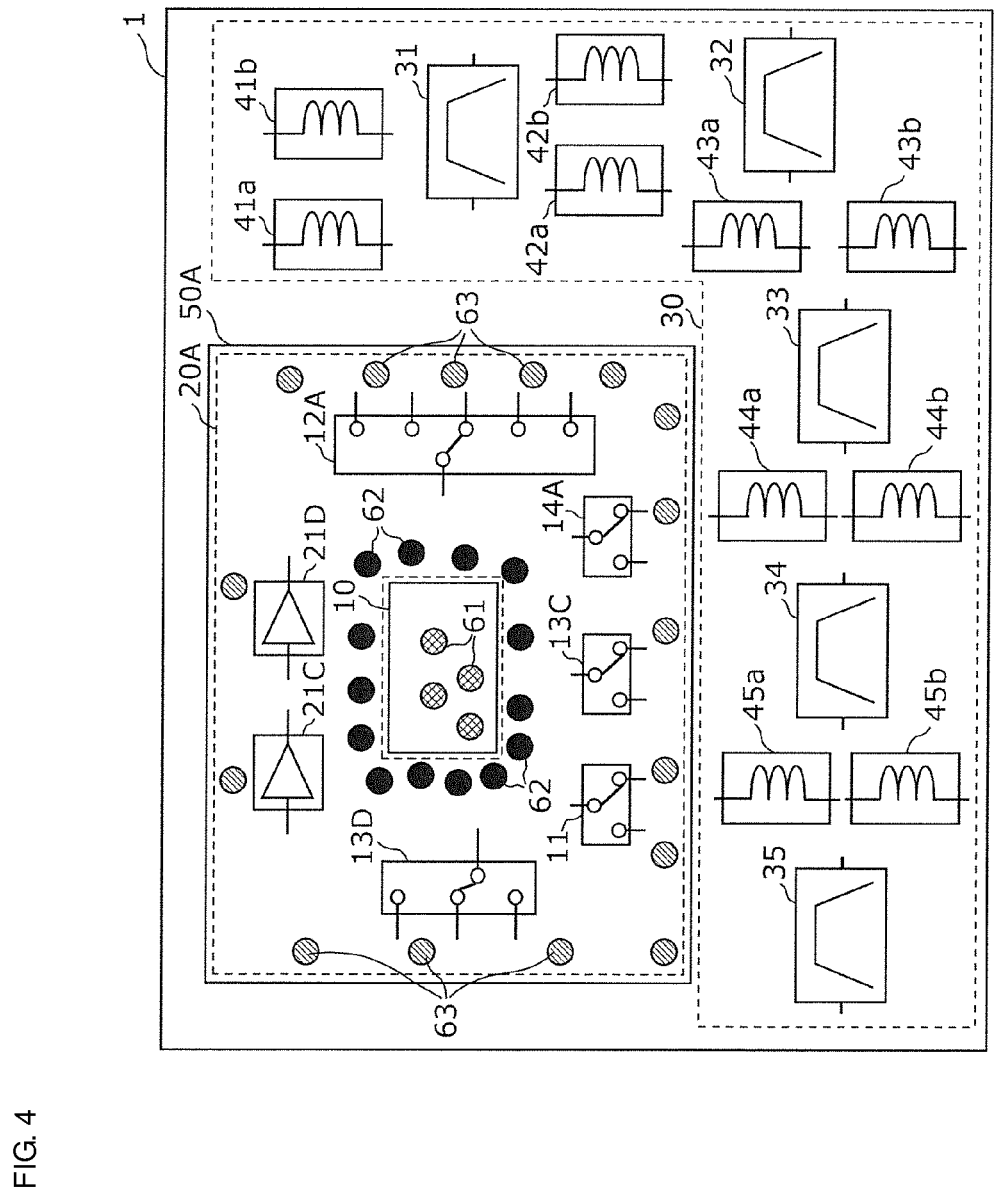
FIG. 4 is a schematic plan view of the circuit layout of a high-frequency module according to a preferred embodiment of the present invention.

FIG. 4 is a schematic plan view representing the circuit layout of the RF module 1 according to a preferred embodiment of the present. The RF module 1 illustrated in FIG. 4 includes a switch IC 50A and a passive circuit 30. The switch IC 50A and the passive circuit 30 are provided in and on the same module substrate.

The switch IC 50A differs from the switch IC 50 according to the preferred embodiment in the layout configuration of analog ground electrodes in a high-frequency circuit 20A. Only points of the configuration of the switch IC 50A, which are different from those of the switch IC 50, will now be described.

The switch IC 50A includes the digital control circuit 10 and the high-frequency circuit 20A. The digital control circuit 10 includes digital ground electrodes 61, which produce a ground potential of the digital control circuit 10. The digital control circuit 10 may include a single digital ground electrode 61 or may include multiple digital ground electrodes 61.

The high-frequency circuit 20A includes multiple analog ground electrodes 62, which produce the ground potential of the high-frequency circuit 20A, and multiple RF electrodes 63 to input and output the high-frequency signals, in addition to the switches 11 to 14A and the low-noise amplifiers 21C and 21D.

The analog ground electrodes 62 are connected to the circuit elements other than the digital control circuit 10 and, for example, are connected to the switches 11 to 14A and the low-noise amplifiers 21C and 21D of the high-frequency circuit 20A.

The passive circuit 30 includes the filters 31 to 35 and the inductors 41a to 47, which are connected to the switches 11 to 14A or the low-noise amplifiers 21C and 21D. The inductors 41a to 47 may preferably be, for example, defined by multiple planar coils provided in the module substrate or chip inductors provided on the module substrate.

Here, the digital control circuit 10 is surrounded by the high-frequency circuit 20A in a plan view of the IC substrate. Since the high-frequency circuit 20A is disposed between the digital control circuit 10 and the passive circuit 30 in the above configuration, it is possible to dispose the digital control circuit 10 so as to be spaced apart from any circuit element of the passive circuit 30. Accordingly, the isolation between the digital control circuit 10 and the passive circuit 30 and the isolation between the digital control circuit 10 and analog lines are improved to reduce or prevent the interference of the digital noise (spurious signal) to the passive circuit 30 and the analog lines. As a result, it is possible to reduce or prevent the degradation of the S/N ratio of the high-frequency signals and the degradation of the receiving sensitivity. In addition, surrounding the digital control circuit 10 with the analog ground electrodes enables the digital control circuit 10 to be efficiently isolated from the high-frequency circuit 20A and the passive circuit 30 to efficiently reduce or prevent the interference of the digital control signals to the high-frequency signals.

In addition, since the digital control circuit 10 is surrounded by the high-frequency circuit 20A, the isolation between the digital control circuit 10 and external circuits of the RF module 1 and the isolation between the digital control circuit 10 and the analog lines in the external circuits are improved. This reduces or prevents the interference of the digital noise (spurious signal) to the external circuits and the analog lines. As a result, it is possible to reduce or prevent the degradation of the S/N ratio of the high-frequency signals and the degradation of the receiving sensitivity.

Furthermore, in the RF module 1 according to the present preferred embodiment, the multiple analog ground electrodes 62 are disposed in a boundary portion with the digital control circuit 10 in the high-frequency circuit 20A so as to surround the digital control circuit 10 in a plan view of the IC substrate. In other words, the multiple analog ground electrodes 62 are disposed at positions closest to the digital control circuit 10 in an inner peripheral portion in the area of the high-frequency circuit 20A surrounding the digital control circuit 10. The multiple RF electrodes 63 are disposed at positions farthest from the digital control circuit 10 in an outer peripheral portion in the area of the high-frequency circuit 20A surrounding the digital control circuit 10.

In the RF module 1 according to the present preferred embodiment, surrounding the digital control circuit 10 with the multiple analog ground electrodes 62 enables the digital control circuit 10 to be efficiently isolated from the high-frequency circuit 20A and the passive circuit 30. In other words, it is possible to ensure the isolation between the high-frequency signals and the digital control signals to efficiently reduce or prevent the interference of the digital control signals to the high-frequency signals.

In addition, even when the number of the digital ground electrodes in the digital control circuit 10 is increased in order to increase digital ground voltage of the digital control circuit 10, it is possible to reduce the effect on the layout design of the high-frequency lines and the analog ground electrodes in the high-frequency circuit 20A and the passive circuit 30.

Figure 5:
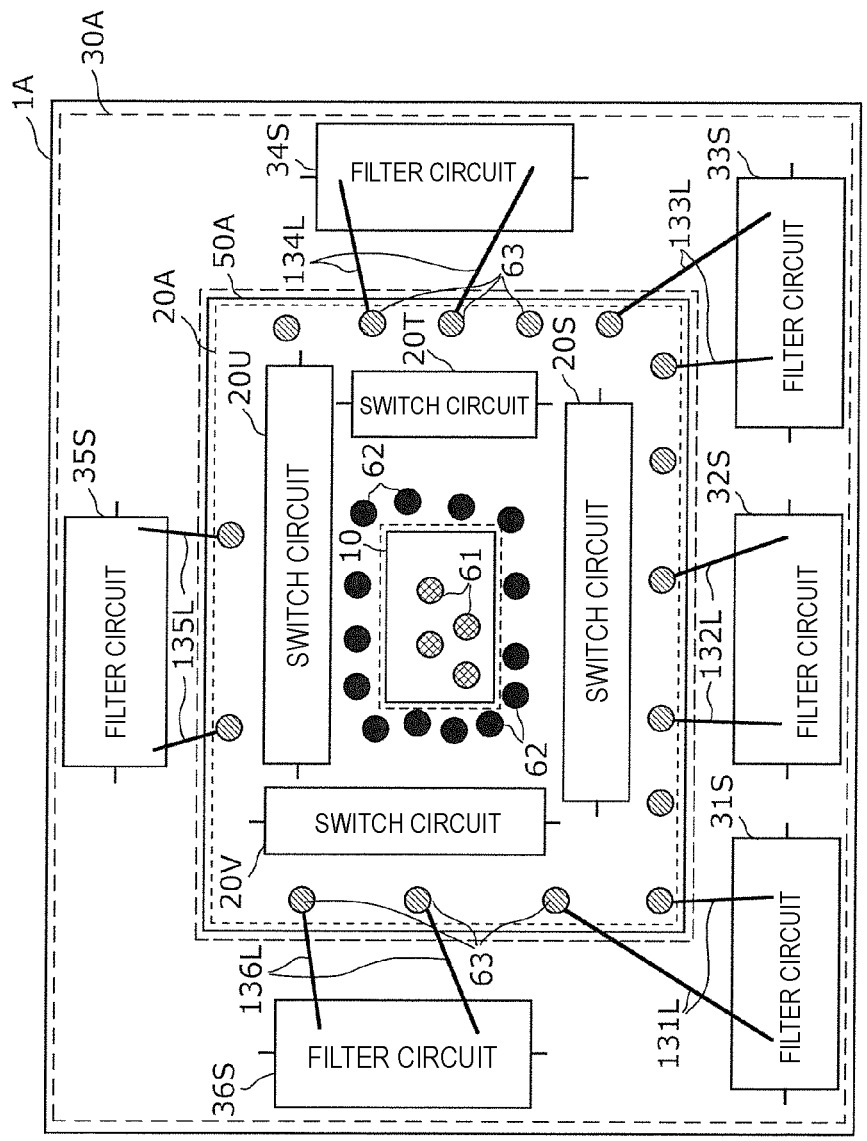
FIG. 5 is a schematic plan view of the circuit layout of a high-frequency module according to a modification of a preferred embodiment of the present invention.

FIG. 5 is a schematic plan view representing the circuit layout of an RF module 1A according to a modification of a preferred embodiment of the present invention. The RF module 1A illustrated in FIG. 5 includes the switch IC 50A and a passive circuit 30A. The switch IC 50A and the passive circuit 30A are disposed in and on the same module substrate.

The RF module 1A according to the present modification differs from the RF module 1 according to the preferred embodiment in the position at which the switch IC 50A is disposed on the module substrate. Only points of the configuration of the RF module 1A which are different from those of the RF module 1 will now be described.

The switch IC 50A includes the digital control circuit 10 and the high-frequency circuit 20A. The high-frequency circuit 20A includes switch circuits 20S, 20T, 20U, and 20V, the multiple analog ground electrodes 62, and the multiple RF electrodes 63. The switch circuits 20S, 20T, 20U, and 20V are exemplified in FIG. 5, instead of the switches 11 to 14A and the low-noise amplifiers 21C and 21D of the high-frequency circuit 20A. Each of the switch circuits 20S, 20T, 20U, and 20V includes at least one of the switches 11 to 14A and the low-noise amplifiers 21C and 21D.

The passive circuit 30A includes filter circuits 31S, 32S, 33S, 34S, 35S, and 36S. The filter circuits 31S to 36S are exemplified in FIG. 5, instead of the filters 31 to 35 and the inductors 41a to 47 of the passive circuit 30. Here, the filter circuit 31S is composed of, for example, the filter 31 and the inductors 41a and 41b in FIG. 1. The filter circuit 32S includes, for example, the filter 32 and the inductors 42a and 42b in FIG. 1. The filter circuit 33S includes, for example, the filter 33 and the inductors 43a and 43b in FIG. 1. The filter circuit 34S includes, for example, the filter 34 and the inductors 44a and 44b in FIG. 1. The filter circuit 35S includes, for example, the filter 35 and the inductors 45a and 45b in FIG. 1. The filter circuit 36S includes a filter and inductors having a pass band different from those of the filters 31 to 35.

In the above configuration of the RF module 1A, the switch IC 50A is surrounded by the passive circuit 30A in a plan view of the module substrate. With this configuration, the respective filter circuits 31S to 36S (the respective circuit elements) of the passive circuit 30A are capable of being radially disposed around the digital control circuit 10 and the high-frequency circuit 20A. In addition, the respective filter circuits 31S to 36S of the passive circuit 30A are capable of being radially disposed for each signal path (frequency band). Accordingly, as illustrated in FIG. 5, it is possible to reduce or prevent the intersection and the parallel extension of the digital lines on which the digital control signals are transmitted and RF lines 131L to 136L with which the passive circuit 30A is connected to the high-frequency circuit 20A. Consequently, it is possible to ensure the isolation between the high-frequency signals and the digital control signals to efficiently reduce or prevent the interference of the digital control signals to the high-frequency signals. In addition, a variation in length between the RF lines 131L to 136L is reduced or prevented to exclude the extremely long high-frequency lines. Accordingly, the high-frequency signal paths having low loss, low stray capacitance, and parasitic inductance are capable of being provided to reduce the area and the size of the RF module. Furthermore, it is possible to improve the isolation between the high-frequency signals, for example, in concurrent transmission and reception of the high-frequency signals of different frequency bands. Furthermore, it is possible to reduce or prevent the radiation of the digital noise to the external circuits of the RF module 1A.

A configuration is conceived in which multiple RF modules 1A, in which the switches and the amplifiers are controlled in response to the digital control signals, are adjacent to each other in an improved multiband front-end circuit. If the digital control signal from another RF module enters one RF module 1A in the front-end circuit, the digital control circuit in the one RF module 1A may react to the digital control signal. In contrast, with the RF module 1A according to the present modification, flowing of current through the digital ground electrodes 61 is reduced or prevented because the switch IC 50A is surrounded by the passive circuit 30A and the digital ground electrodes 61 are isolated from the analog ground electrodes 62. Accordingly, it is possible to avoid jumping of frequency multiplication waves having the clock frequency of the digital control signals into the high-frequency lines as a spurious signal to reduce or prevent the degradation of the receiving sensitivity in the one RF module 1A.

Specifically, the high-frequency module according to a preferred embodiment of the present invention includes the digital control circuit, digital controlled high-frequency elements that are controlled in response to the digital control signals supplied from the digital control circuit, and non-digital controlled high-frequency elements that are not controlled in response to the digital control signals, among multiple high-frequency elements processing the high-frequency signals. The digital control circuit and the multiple digital controlled high-frequency elements define the switch IC, and the switch IC and the multiple non-digital controlled high-frequency elements define the high-frequency module. The digital controlled high-frequency elements correspond to the switches 11 to 14A and the low-noise amplifiers 21C and 21D of the high-frequency circuit 20A in the RF module 1 according to the present preferred embodiment. The non-digital controlled high-frequency elements correspond to the filters 31 to 35 and the inductors 41a to 47 in the RF module 1 according to the present preferred embodiment.

In the above configuration, the digital control circuit is surrounded by the multiple digital controlled high-frequency elements. Accordingly, since the digital controlled high-frequency elements are disposed between the digital control circuit and the non-digital controlled high-frequency elements, it is possible to dispose the digital control circuit so as to be spaced apart from any non-digital controlled high-frequency element. Consequently, it is possible to reduce or prevent the interference of the digital noise (spurious signal) to the non-digital controlled high-frequency elements to improve the S/N ratio of the high-frequency signals, the receiving sensitivity, and the isolation between the high-frequency signals. In addition, the switch IC is surrounded by the multiple non-digital controlled high-frequency elements. Accordingly, since the multiple non-digital controlled high-frequency elements are radially disposed around the digital control circuit, it is possible to reduce or prevent the intersection and the parallel extension of the digital lines on which the digital control signals are transmitted and the high-frequency lines with which the multiple non-digital controlled high-frequency elements are connected to the multiple digital controlled high-frequency elements. Furthermore, a variation in length between the respective high-frequency lines is reduced or prevented to exclude the extremely long high-frequency lines. Accordingly, it is possible to improve the isolation between the high-frequency signals, for example, in concurrent transmission and reception of the high-frequency signals of different frequency bands. Furthermore, it is possible to reduce or prevent the radiation of the digital noise to the external circuits of the high-frequency module.

Next, the wiring configuration and the electrode layout configuration in and on the module substrate of the RF module 1A will now be described.

Figure 6:
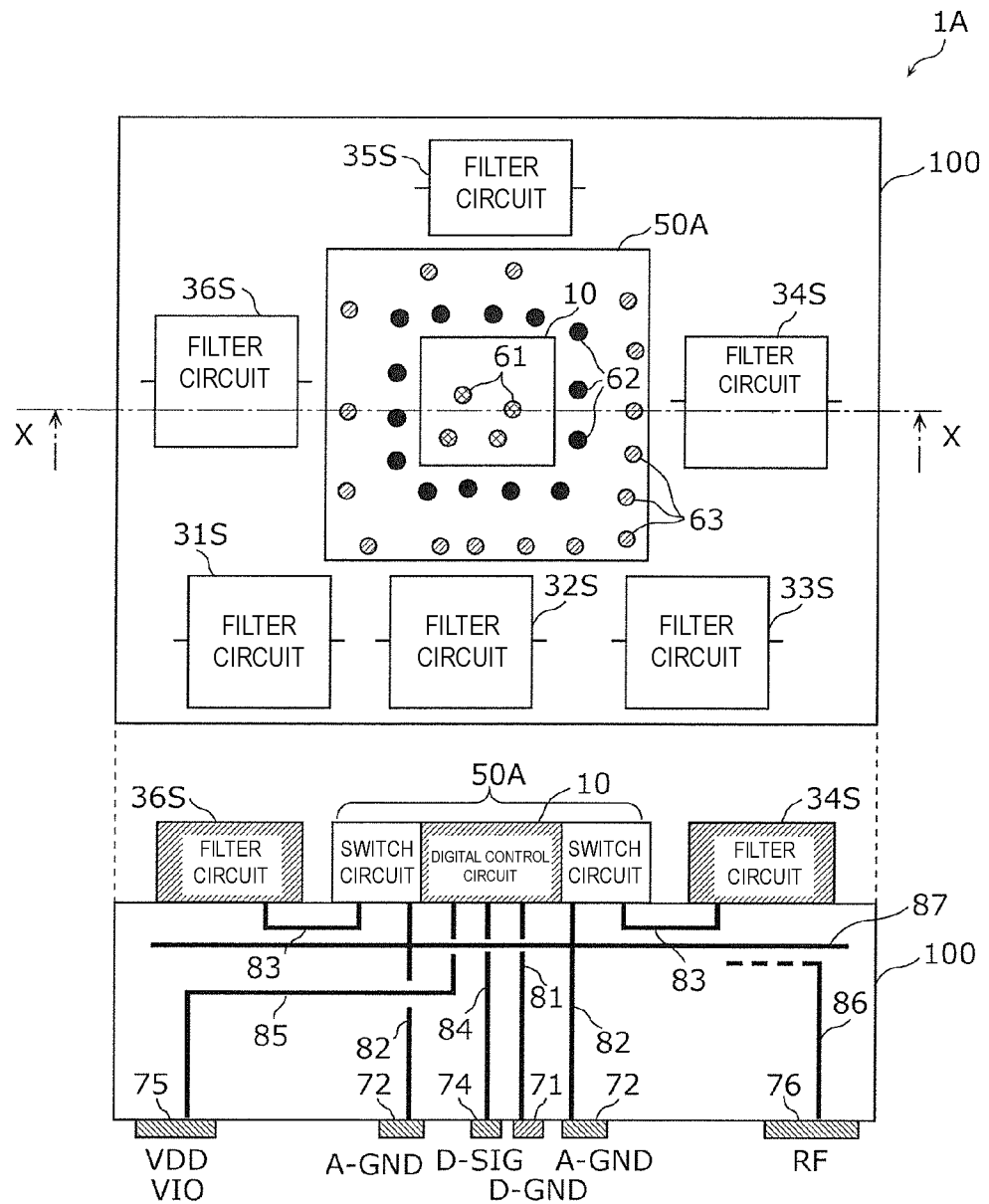
FIG. 6 includes a schematic plan view and a schematic cross-sectional view of the circuit layout of the high-frequency module according to the modification of the preferred embodiment of the present invention.

FIG. 6 includes a schematic plan view and a schematic cross-sectional view representing the circuit layout of the RF module 1A according to a modification of a preferred embodiment of the present invention. The plane configuration of the RF module 1A is illustrated in an upper portion in FIG. 6, as in FIG. 5. More specifically, the layout configuration of the switch IC 50A and the filter circuits 31S to 36S of the passive circuit 30A on a module substrate 100 is illustrated. A cross-section taken along an X-X line of the RF module 1A illustrated in the upper portion is illustrated in a lower portion in FIG. 6.

As illustrated in the lower portion in FIG. 6, the module substrate 100 includes ground via lines 81 and 82, an in-substrate ground line 87, RF lines 83 and 86, digital lines 84, a power supply line 85, digital ground terminals 71, analog ground terminals 72, digital terminals 74, a power supply terminal 75, and RF terminals 76.

The digital ground terminals 71, the analog ground terminals 72, the digital terminals (first terminals) 74, the power supply terminal (a third terminal) 75, and the RF terminals (second terminals) 76 are electrode terminals for external connection, which are provided on a rear surface (a second main surface) of the module substrate 100.

The ground via lines 81 are second ground via lines that are connected to the multiple digital ground electrodes 61 and the digital ground terminals 71 and that extend from a front surface (a first main surface) of the module substrate 100 to the rear surface (the second main surface) thereof.

The ground via lines 82 are first ground via lines that are connected to the multiple analog ground electrodes 62 and the analog ground terminals 72 and that extend from the front surface (the first main surface) of the module substrate 100 to the rear surface (the second main surface) thereof. The ground via lines 82 are connected to the in-substrate ground line 87 in the module substrate 100 and are isolated from the ground via lines 81 in the module substrate 100.

The RF lines 83 are high-frequency lines with which the respective switch circuits in the high-frequency circuit 20A are connected to the respective filter circuits in the passive circuit 30A.

The digital lines 84 are digital lines through which digital control signals are transmitted to the respective switch circuits in the high-frequency circuit 20A and which extend from the front surface (the first main surface) of the module substrate 100 to the rear surface (the second main surface) thereof.

The power supply line 85 is a power supply line through which power supply voltage (for example, VDD and VIO) is supplied to the digital control circuit 10 and the high-frequency circuit 20A and which extends from the rear surface (the second main surface) of the module substrate 100 to the front surface (the first main surface) thereof.

The RF lines 86 are high-frequency lines that are connected to the high-frequency circuit 20A or the passive circuit 30A and the RF terminals (the second terminals) 76 and that extend from the front surface (the first main surface) of the module substrate 100 to the rear surface (the second main surface) thereof.

The ground via lines 81 and the ground via lines 82 are isolated from each other in the module substrate 100. Accordingly, the isolation between the ground via lines 82 (analog ground lines) and the ground via lines 81 (digital ground lines) is improved to reduce or prevent the interference of the digital noise (spurious signal) to the high-frequency signals via the ground via lines 81 and 82 in the module substrate 100. As a result, it is possible to reduce or prevent the degradation of the S/N ratio of the high-frequency signals and the degradation of the receiving sensitivity.

In a plan view of the rear surface of the module substrate 100, all of the RF terminals (second terminals) 76 are disposed in an outer peripheral portion of all of the digital terminals (the first terminals) 74. With this configuration, since the digital control circuit 10 is disposed in a central portion of the front surface (the first main surface) of the module substrate 100 and the digital terminals (the first terminals) 74 are disposed in a central portion of the rear surface (the second main surface) thereof (a position opposed to the digital control circuit 10 with the module substrate 100 sandwiched therebetween), the digital lines 84 are capable of being wired in the module substrate 100 in a shortest configuration. In addition, since the RF lines 86 are disposed in an outer peripheral portion of the digital lines 84, the isolation between the RF lines 86 and the digital lines 84 is improved to reduce or prevent the interference of the signals on the digital lines 84 on the signals on the RF lines 86. As a result, it is possible to reduce or prevent the degradation of the S/N ratio of the high-frequency signals and the degradation of the receiving sensitivity. Furthermore, it is possible to easily isolate the analog lines and the digital lines from each other in a mounting substrate on which the RF module 1A is mounted.

As illustrated in the lower portion in FIG. 6, in a plan view of the rear surface (the second main surface) of the module substrate 100, the power supply terminal (the third terminal) 75 may be disposed in an outer peripheral portion of all of the digital terminals (the first terminals) 74. With this configuration, the power supply line 85 is disposed in an outer peripheral portion of the digital lines 84 and the isolation between the power supply line 85 and the digital lines 84 is capable of being ensured while supplying the power supply voltage to the digital control circuit 10 and the high-frequency circuit 20A through the power supply line 85. In addition, for example, a decoupling capacitor necessary for the power supply line 85 is capable of being easily disposed in the RF module or in a portion closest to the module substrate 100.

Although the switch ICs, the high-frequency modules, and the communication apparatuses according to the preferred embodiments of the present invention are described above, the switch ICs, the high-frequency modules, and the communication apparatuses of the present invention are not limited to the above preferred embodiments. Other preferred embodiments provided by combining arbitrary components in the above preferred embodiments, modifications resulting from making various changes conceived by the persons skilled in the art to the above preferred embodiments without departing from the scope and sprit of the present invention, and various devices incorporating the switch ICs, the high-frequency modules, and the communication apparatuses of the present disclosure are also included in the present invention.

For example, in the switch ICs, the high-frequency modules, and the communication apparatuses according to the above preferred embodiments, other high-frequency circuit elements and lines, for example, may be inserted between the respective circuit elements and the paths with which the signal paths are connected, which are disclosed in the drawings.

In addition, each of the high-frequency circuits 20 and 20A may be made of a complementary metal oxide semiconductor (CMOS). In this case, the switch ICs 50 and 50A are capable of being inexpensively manufactured.

Furthermore, each of the high-frequency circuits 20 and 20A may be made of a GaAs. In this case, it is possible to output the high-frequency signals having high-quality amplification performance and noise performance.

Furthermore, each of the switch ICs 50 and 50A may be made of a CMOS. In this case, the switch ICs 50 and 50A are capable of being more inexpensively manufactured.

Furthermore, each of the switch ICs 50 and 50A may be made of a GaAs. In this case, it is possible to output the digital control signals having high quality and to output the high-frequency signals having high-quality amplification performance and noise performance.

Furthermore, each of the switch ICs 50 and 50A according to the present invention may be defined by a large scale integrated (LSI) circuit, which is an integrated circuit. In addition, the integrated circuit may be defined by a dedicated circuit or a general-purpose processor. A field programmable gate array (FPGA) capable of being programmed or a reconfigurable processor capable of reconfiguring connection and settings of circuit cells in the LSI circuit may be used after manufacturing the LSI circuit. Furthermore, the functional blocks may be integrated using any technology of the integrated circuit with which the LSI circuit is replaced, which emerges due to the progress of the semiconductor technology or another derivative technology.

Preferred embodiments of the present invention are capable of being widely used in communication devices, such as mobile phones, for example, as a high-frequency module provided in a multiband-multimode front-end unit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switch IC comprising:
   an IC substrate;
   a high-frequency circuit provided on the IC substrate and including at least one amplifier amplifying at least one high-frequency signal and at least one switch switching a propagation path of the at least one high-frequency signal; and
   a digital control circuit provided on the IC substrate; wherein
   in a plan view of the IC substrate, the digital control circuit is surrounded by the at least one amplifier and the at least one switch of the high-frequency circuit; and
   the digital control circuit is located between the at least one amplifier and the at least one switch.

2. The switch IC according to claim 1, wherein
   the digital control circuit has a rectangular or substantially rectangular shape; and
   at least one circuit element of the high-frequency circuit is disposed at a position opposed to any side of the rectangular or substantially rectangular shape.

3. The switch IC according to claim 1, wherein respective circuit elements of the high-frequency circuit are radially disposed around the digital control circuit.

4. A high-frequency module comprising:
   a module substrate including a first main surface and a second main surface that are opposed to each other;
   the switch IC according to claim 1, provided on the first main surface; and
   a passive circuit provided in and on the module substrate and connected to at least one of the amplifier and the switch; wherein
   the high-frequency circuit includes a plurality of analog ground electrodes; and
   the plurality of analog ground electrodes are disposed in a boundary portion with the digital control circuit in the high-frequency circuit so as to surround the digital control circuit in the plan view.

5. The high-frequency module according to claim 4, wherein the switch IC is surrounded by the passive circuit in a plan view of the module substrate.

6. The high-frequency module according to claim 4, wherein
   the digital control circuit includes a digital ground electrode;
   the module substrate includes:
      a first ground via line connected to the plurality of analog ground electrodes and extending from the first main surface to the second main surface; and
      a second ground via line connected to the digital ground electrode and extending from the first main surface to the second main surface; and
   the first ground via line and the second ground via line are isolated from each other in the module substrate.

7. The high-frequency module according to claim 4, wherein
   the module substrate includes:
      a digital line through which a digital control signal to switch between conduction and non-conduction of the switch is transmitted and extending from the first main surface to the second main surface;
      an analog line through which the high-frequency signal is transmitted and extending from the first main surface to the second main surface;
      at least one first terminal connected to the digital line and disposed on the second main surface; and
      at least one second terminal connected to the analog line and disposed on the second main surface; and
   all of the at least one second terminals are disposed in an outer peripheral portion of all of the at least one first terminals in a plan view of the second main surface.

8. The high-frequency module according to claim 7, wherein
   the module substrate further includes:
      a power supply line through which power supply voltage is supplied to the digital control circuit and the high-frequency circuit and extending from the first main surface to the second main surface; and
      a third terminal connected to the power supply line and disposed on the second main surface; and
   the third terminal is disposed in an outer peripheral portion of all of the at least one first terminals in the plan view of the second main surface.

9. The high-frequency module according to claim 4, further comprising:
   a first input-output terminal and a second input-output terminal; wherein
   the switch of the high-frequency circuit includes:

a first switch that switches connection of the first input-output terminal to either of a first signal path on which a high-frequency signal in a first frequency band is propagated and a second signal path on which a high-frequency signal in a second frequency band at the high frequency side of the first frequency band is propagated; and a second switch that switches connection of the amplifier to either of the first signal path and the second signal path; wherein the amplifier is connected between the second switch and the second input-output terminal; and the passive circuit includes:

a first filter disposed on the first signal path between the first switch and the second switch and a pass band of which is the first frequency band;

a second filter disposed on the second signal path between the first switch and the second switch and a pass band of which is the second frequency band; and an impedance matching element disposed on the first signal path or the second signal path and incorporated in the module substrate.

10. The high-frequency module according to claim 4, wherein the digital control circuit has a rectangular or substantially rectangular shape; and at least one circuit element of the high-frequency circuit is disposed at a position opposed to any side of the rectangular or substantially rectangular shape.

11. The high-frequency module according to claim 4, wherein respective circuit elements of the high-frequency circuit are radially disposed around the digital control circuit.

12. A communication apparatus comprising:

an RF signal processing circuit that processes a high-frequency signal transmitted and received with an antenna element; and the high-frequency module according to claim 4, which transmits the high-frequency signal between the antenna element and the RF signal processing circuit.

13. The communication apparatus according to claim 12, wherein the switch IC is surrounded by the passive circuit in a plan view of the module substrate.

14. The communication apparatus according to claim 12, wherein the digital control circuit includes a digital ground electrode;

the module substrate includes:

a first ground via line connected to the plurality of analog ground electrodes and extending from the first main surface to the second main surface; and a second ground via line connected to the digital ground electrode and extending from the first main surface to the second main surface; and the first ground via line and the second ground via line are isolated from each other in the module substrate.

15. The communication apparatus according to claim 12, wherein the module substrate includes:

a digital line through which a digital control signal to switch between conduction and non-conduction of the switch is transmitted and extending from the first main surface to the second main surface;

an analog line through which the high-frequency signal is transmitted and extending from the first main surface to the second main surface;

at least one first terminal connected to the digital line and disposed on the second main surface; and at least one second terminal connected to the analog line and disposed on the second main surface; and all of the at least one second terminals are disposed in an outer peripheral portion of all of the at least one first terminals in a plan view of the second main surface.

16. The communication apparatus according to claim 15, wherein the module substrate further includes:

a power supply line through which power supply voltage is supplied to the digital control circuit and the high-frequency circuit and extending from the first main surface to the second main surface; and a third terminal connected to the power supply line and disposed on the second main surface; and the third terminal is disposed in an outer peripheral portion of all of the at least one first terminals in the plan view of the second main surface.

17. The communication apparatus according to claim 12, further comprising:

a first input-output terminal and a second input-output terminal; wherein the switch of the high-frequency circuit includes:

a first switch that switches connection of the first input-output terminal to either of a first signal path on which a high-frequency signal in a first frequency band is propagated and a second signal path on which a high-frequency signal in a second frequency band at the high frequency side of the first frequency band is propagated; and a second switch that switches connection of the amplifier to either of the first signal path and the second signal path; wherein the amplifier is connected between the second switch and the second input-output terminal; and the passive circuit includes:

a first filter disposed on the first signal path between the first switch and the second switch and a pass band of which is the first frequency band;

a second filter disposed on the second signal path between the first switch and the second switch and a pass band of which is the second frequency band; and an impedance matching element disposed on the first signal path or the second signal path and incorporated in the module substrate.

18. The communication apparatus according to claim 12, wherein the digital control circuit has a rectangular or substantially rectangular shape; and at least one circuit element of the high-frequency circuit is disposed at a position opposed to any side of the rectangular or substantially rectangular shape.

19. The communication apparatus according to claim 12, wherein respective circuit elements of the high-frequency circuit are radially disposed around the digital control circuit.

* * * * *